US008280592B2

(12) United States Patent
Wisniowski

(10) Patent No.: US 8,280,592 B2
(45) Date of Patent: Oct. 2, 2012

(54) MOTOR VEHICLE FOR CAR TO CAR COMMUNICATION AND ASSOCIATED METHOD FOR OPERATING AN ANTENNA STRUCTURE OF A MOTOR VEHICLE

(75) Inventor: Damian Wisniowski, Bocholt (DE)

(73) Assignee: Continental Automotive Gmbh, Hannover (DE)

( * ) Notice: Subject to any disclaimer, the term of this patent is extended or adjusted under 35 U.S.C. 154(b) by 917 days.

(21) Appl. No.: 12/093,174

(22) PCT Filed: Nov. 6, 2006

(86) PCT No.: PCT/EP2006/068115
§ 371 (c)(1),
(2), (4) Date: Jan. 30, 2009

(87) PCT Pub. No.: WO2007/054475
PCT Pub. Date: May 18, 2007

(65) Prior Publication Data
US 2009/0222173 A1 Sep. 3, 2009

(30) Foreign Application Priority Data
Nov. 9, 2005 (DE) ......................... 10 2005 053 510

(51) Int. Cl.
*H01Q 1/32* (2006.01)
*H01Q 3/00* (2006.01)
*G06F 17/00* (2006.01)

(52) U.S. Cl. ........................... 701/49; 343/757; 342/377

(58) Field of Classification Search .................... 701/49; 343/757, 713; 342/377
See application file for complete search history.

(56) References Cited

U.S. PATENT DOCUMENTS

| | | | | |
|---|---|---|---|---|
| 3,187,329 | A * | 6/1965 | Midlock | 342/104 |
| 4,158,841 | A * | 6/1979 | Wuchner et al. | 342/71 |
| 6,512,481 | B1 | 1/2003 | Velazquez et al. | |
| 6,593,880 | B2 | 7/2003 | Velazquez et al. | |
| 6,750,810 | B2 * | 6/2004 | Shinoda et al. | 342/149 |
| 6,765,523 | B2 * | 7/2004 | Ono | 342/70 |
| 6,812,882 | B2 * | 11/2004 | Ono | 342/70 |

(Continued)

FOREIGN PATENT DOCUMENTS

DE 10306266 A1 9/2003

(Continued)

OTHER PUBLICATIONS

Hedebaut et al. "Broadband vehicle-to vehicle communication using an extended autonomous cruise control sensor", Measurement Science and Technology, Institute of Physics Publishing UK, vol. 16 No. 6, Jun. 2005, pp. 1363-1373, XP-002419160.

*Primary Examiner* — Drew Brown
(74) *Attorney, Agent, or Firm* — Laurence A. Greenberg; Werner H. Stemer; Ralph E. Locher

(57) ABSTRACT

A motor vehicle is equipped for radio communication with at least one further motor vehicle. An antenna structure is used to transmit and receive useful signals. The antenna structure can be controlled with the aid of a control device in such a way that it is possible to change the setting of the main lobe of the antenna. A method is also disclosed for operating an antenna structure which is installed in a motor vehicle.

14 Claims, 2 Drawing Sheets

U.S. PATENT DOCUMENTS

| | | | | |
|---|---|---|---|---|
| 6,831,611 | B2 | 12/2004 | Ooe et al. | |
| 6,853,329 | B2 * | 2/2005 | Shinoda et al. | 342/149 |
| 6,900,754 | B2 * | 5/2005 | Ono et al. | 342/158 |
| 6,959,173 | B2 * | 10/2005 | Kawai | 455/95 |
| 2003/0156069 | A1 | 8/2003 | Ooe et al. | |
| 2007/0222662 | A1 | 9/2007 | Toennesen et al. | |

FOREIGN PATENT DOCUMENTS

| | | | |
|---|---|---|---|
| WO | 9816077 | A2 | 4/1998 |
| WO | 2005073753 | A1 | 8/2005 |

* cited by examiner

MOTOR VEHICLE FOR CAR TO CAR COMMUNICATION AND ASSOCIATED METHOD FOR OPERATING AN ANTENNA STRUCTURE OF A MOTOR VEHICLE

Motor vehicle for car to car communication and associated method for operating an antenna structure of a motor vehicle

BACKGROUND OF THE INVENTION

Field of the Invention

The invention relates to a motor vehicle which is equipped for radio communication with at least one further motor vehicle, comprising an antenna structure which can be used to transmit and receive useful signals and also to a method for operating such an antenna structure.

Known vehicles with an antenna structure which are basically suited for car to car communication are based on conventional antennae which feature a static radiation pattern or directional radio pattern. Such motor vehicles have the disadvantage that they are disadvantageous for the establishment and maintenance of a communication connection such that establishing radio connections is in part very time-consuming and an existing radio connection often needs to be interrupted and restarted again because of external boundary conditions.

BRIEF SUMMARY OF THE INVENTION

Based on this, the object underlying the invention is to specify an antenna structure and/or a motor vehicle with an antenna structure for radio communication, in which radio connections can be more reliably started up and maintained. Moreover, a method is to be specified for operating antenna structures which are used in such a motor vehicle.

This object is achieved by the independent claims. Advantageous embodiments form the subject matter of the subclaims.

As regards the antenna structure and/or the motor vehicle, the object is also achieved here in that the antenna structure can be controlled with the aid of a controller in such a way that it is possible to change the setting of the main lobe of said antenna.

If the case is examined, in which a radio connection is to take place between two motor vehicles moving at a variable distance from on another across the same street, the controllable antenna structure offers the advantage that possible alterations to the spatial alignment of the longitudinal axle of the motor vehicle can be taken into account. As the antenna structure is controllable in a different way to the prior art, the main lobe of the radiation pattern of the antenna structure of the motor vehicle can be modified in a suitable way in order to maintain the quality of a radio connection with a motor vehicle traveling forwards for instance, or in any case to optimize it for a particular alignment of the motor vehicles in respect of each other.

The antenna structure can preferably feature a plurality of individual emitters, with the controller being adjusted in such a way that by activating phasings of signals of the individual emitters, the alignment of the main lobe can be set in a horizontal plane of the radiation pattern. This embodiment is advantageous in that the control possibilities for the antenna structure are essentially restricted to a horizontal plane. This is thus possible because two motor vehicles connected to one another in a radio communication connection do not typically vary appreciably in terms of their geographical elevation.

In addition to aligning the main lobe of the antenna structure, it may be advantageous per se if the controller is adjusted in order to alter a beam spread angle of the main lobe. This permits said beam spread angle to enlarge or diminish according to the prevailing external boundary conditions. A larger beam spread angle has the advantage that a requirement for the construction of a radio communication connection with the additional motor vehicle is improved if the distance between the two motor vehicles is not too great. If the beam spread angle is reduced and hence the solid angle exposed by the antenna structure is diminished, then the data rate for the radio communication connection can however also increase in respect of range.

In a preferred embodiment of the motor vehicle, the controller is adjusted in such a way that the beam spread angle of the main lobe of the antenna structure is reduced with an increasing vehicle speed. Expressed oppositely, a comparatively large beam spread angle is operated with a lower vehicle speed, which is advantageous in that to the detriment of a narrow spread, which is self-explanatorily justifiable at a low vehicle speed, a larger solid angle can be covered for the reception of signals of additional motor vehicles.

It can be directly beneficial for the construction of a new communication connection for the controller to be adjusted in such a way that the angle of the direction of the main lobe of the antenna structure is continually changed. This can be accomplished with the aid of a to and fro movement of the angel of the direction of the main lobe of the antenna structure for example. In this way, scanning of the motor vehicle's surroundings is made possible according to receivable useful signals.

It can be beneficial to the construction of a new communication connection if a maximum angle of deflection for the to and fro movement of the main lobe of the antenna structure is reduced with an increasing traveling speed. The background here is also that with an increasing travelling speed, a typical distance between two motor vehicles which could establish a communication connection in respect of one another is greater, so that the antenna structure has to be operated in order to guarantee an increased range. To this end, scanning of the surroundings has to be based on a narrower beam spread angle.

The object cited above is achieved in respect of the method by a method for operating an antenna structure installed in a motor vehicle, which can be used to transmit and receive useful signals, with the antenna structure being controlled with the aid of a controller in such a way that a setting of its main lobe can be changed.

The method ensures operation of the antenna structure which allows for an adjustment to variable channel conditions for a radio communication.

The antenna structure is preferably controlled in such a way that an alignment of the main lobe in a horizontal plane of the radiation pattern is set by way of the activation of phasings of signals of individual emitters. In this case, the antenna structure is present as a field of individual emitters which can be individually controlled in respect of the phasings of their signals, so that an alignment of the main lobe of the antenna structure, which is a superimposition of individual lobes of the individual emitters, can be set.

As far as is transferable onto the antenna structure or the method, possible or advantageous embodiments of the motor vehicle illustrated above are also to be regarded as advantageous embodiments of the antenna structure or method.

Exemplary embodiments of the invention are subsequently described in greater detail below with reference to the drawings.

DESCRIPTION OF THE INVENTION

Figure 1:
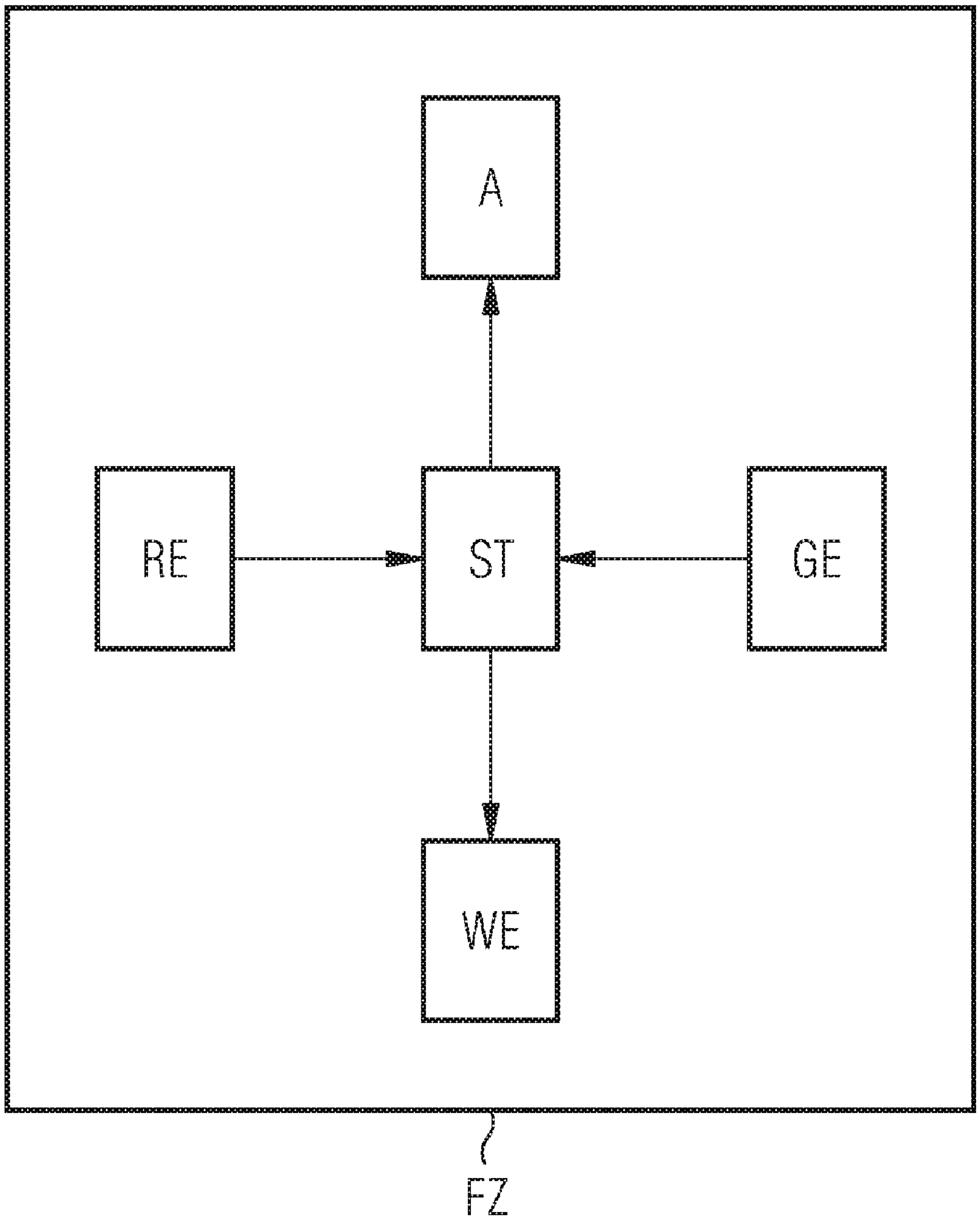
FIG. 1 shows a block diagram of essential components of a motor vehicle for radio communication with another motor vehicle.
Figure 2:
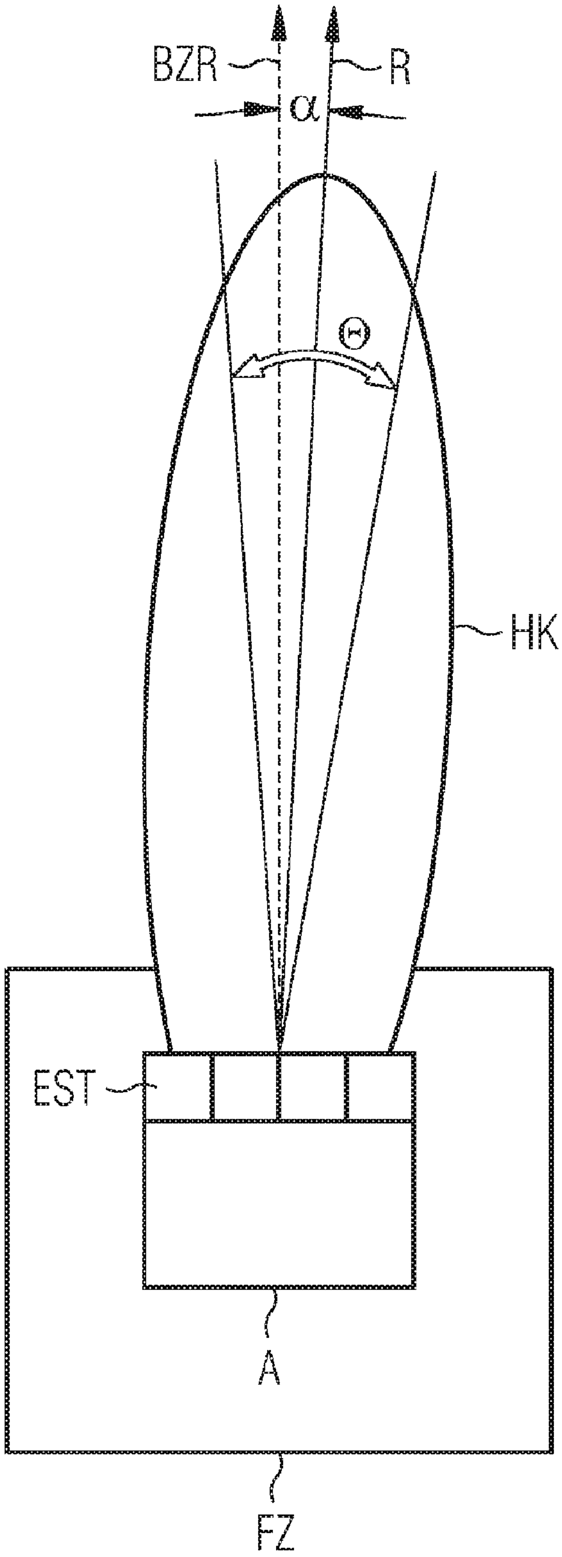
FIG. 2 shows an exemplary motor vehicle, in which the antenna structure of FIG. 1 is shown in more detail, while the other components of FIG. 1 are left out for improved clarification purposes.

A motor vehicle FZ shown in the figures is equipped with an antenna structure A which can be controlled with the aid of a controller ST. The antenna structure is composed of a plurality (two or more) of individual emitters EST which each feature an individual radiation pattern. A superimposition of the radiation patterns of the individual emitters produces a collective main lobe HK of the antenna structure A, which can be changed by the controller ST in respect of its properties. It should be noted that the main lobe in an antenna diagram features the maximum quantity of sent energy with the transmitting antennae and the maximum sensitivity with the receiving antennae. A beam antenna bundles this emission in one direction. This bundling increases the range of the antenna. This range increase is known as gain. The boundaries of a lobe are set at 3 dB by the drop of field strength. The beam width or half-power bandwidth is the range in which the emission has not yet fallen to less than −3 dB=0.5. This angular range is also called beam spread angle. This beam spread angle is labeled with the Greek letter Θ (Theta).

The controller ST influences the direction of the main lobe, namely in the horizontal level, by suitable activation of phasings of signals of individual emitters.

With the aid of the controller ST, methods implemented in software can be carried out for instance, the properties of which are influenced by the antenna structure A. The controller ST is connected to a speed recording device GE in order to be able to control the operation of the antenna structure A as a function of a vehicle speed. A direction recording device RE delivers output signals to the controller ST which reproduce the current steering movements of the motor vehicle. To this extent an inclusion of steering movements of the motor vehicle is enabled by a controller of the antenna structure A.

In the exemplary embodiment introduced, the controller ST is also used simultaneously to process useful signals received over the antenna structure A for display purposes on a playback device WE. The controller ST can also process input signals of various kinds in such a way that they can be emitted as useful signals over the antenna structure A.

In a first exemplary embodiment, the controller ST is set up in such a way that a beam spread angle Θ of the main lobe HK of the antenna structure A is adjusted to a vehicle speed. With slower vehicle speeds, the beam spread angle is enlarged, which simultaneously reduces the gain of the antenna structure in the main lobe device, and also results in a smaller range. On the other hand, the beam spread angle Θ is reduced at higher vehicle speeds, such that the range of the antenna structure is automatically enlarged.

This exemplary embodiment for the setup of the controller ST provides for a method, in which a vehicle safety is increased, since at faster speeds, like e.g. on a motorway, information relevant to safety can be received earlier due to the higher range of the antenna structure A, and the driver of the motor vehicle has more time to react appropriately. An example of information which should be signaled to the driver as soon as possible are slippery areas of road, as can emerge cumulatively on bridges, or hidden traffic jams, for which fast reactions on the part of the driver can be necessary.

If on the other hand the motor vehicle is traveling at a lower speed, like for example in urban traffic, a large range for the antenna structure A is thus not so important. This can be used to make the beam spread angle of the main lobe as large as possible, so that information from many other motor vehicles can be received in the form of useful signals by way of the antenna structure A from the immediate surroundings.

In a second exemplary embodiment for the setup of the controller ST, it is assumed that a radio connection has not yet been set up with another motor vehicle. It is expedient in this case for the angle α of the direction R of the main lobe HK of the antenna structure A to be continually changed to a reference direction or straight BZR (in particular of the longitudinal axle of the motor vehicle FZ) and adjusted to the motor vehicle speed, with it being possible to supply the latter by means of the speed recording device GE. The angle α in which the main lobe of the antenna structure A is continually moved back and forth should be larger in the case of a slower vehicle speed, and smaller in the case of a faster vehicle speed. This is advantageous in that with a faster vehicle speed the main lobe can be concentrated on a solid angle, from which information relevant to safety can be expected, if necessary. Information relevant to safety can preferably be emitted from far away from the vehicle, in fact does not necessarily have to be from another vehicle but can instead also be from a fixed transmitting station. With a slow vehicle speed, the possible angle for the alignment of the main lobe is expanded, so that further areas of space located off to the side can also be scanned.

In a third exemplary embodiment, which concerns a further development of the second exemplary embodiment, the movement of the main lobe in the preferred horizontal plane is adjusted to the vehicle speed but not continuously. With a faster travelling speed, the main lobe is moved more often and slower in a central direction, i.e. in the area of a longitudinal axle of the motor vehicle, while external angular ranges up to a maximum angle are crossed less and less often. With a slower vehicle speed the continuous locomotion of the alignment of the main lobe is retained.

In a fourth exemplary embodiment, the beam spread angle Θ of the main lobe of the antenna structure A is likewise varied in order to establish a new radio connection with the vehicle speed. With a faster traveling speed, the beam spread angle of the main lobe is kept small more often and for a longer period of time. It will take on large values comparatively less often, and also only for a comparatively shorter period of time. In contrast, with a slower vehicle speed, the beam spread angle can be large more often and for a longer period of time.

In a fifth exemplary embodiment, the output signals of the direction recording device RE are considered which in particular reproduce steering movements for the motor vehicle. The main lobe of the antenna structure A is directed more often in the direction of the steering movement for a specific period of time, i.e. in what is henceforth the direction aimed at by the motor vehicle. Alternatively, it is also possible to expand the original angle, within which the main lobe can be changed in terms of its direction, in order to expand a further angle which is generated from the angle which corresponds to the steering movement of the motor vehicle.

In a sixth exemplary embodiment, the controller ST set up in such a way that its main lobe HK is aligned adaptively to changed positions of a transmitter which has just been received. To this end, the controller ST can directly evaluate a signal strength of the received signals from the antenna structure A, and then change the alignment of the main lobe if necessary, or even the beam spread angle for the movement of the main lobe. Both measures guarantee consideration of a change of position of the transmitter which has just been received.

It is also possible to embody the controller ST in such a way that the contents of received messages are taken into consideration. If, for example, a message relevant to safety is received, concerning a slippery road on a bridge or a car accident at a specific position, then the main lobe of the antenna structure A is controlled into the direction of the expected danger either merely cumulatively or permanently.

In a further exemplary embodiment, the co-operation of the controller ST with a navigation system for motor vehicles can also proceed as far as is available. The navigation system can thereby prepare information concerning expected changes of direction for the motor vehicle, so that the antenna structure A can be activated by the controller ST in such a way that the main lobe is always aligned to an area of space currently being passed through.

The invention claimed is:

1. An antenna structure assembly for enabling radio communication of a first motor vehicle with at least one other motor vehicle, and for transmitting and receiving useful communication signals, comprising:
- an antenna structure mounted to the first motor vehicle, said antenna structure having a main lobe;
- a controller connected to said antenna structure and having an input for receiving from a speed recording device of the motor vehicle a signal representing a travel speed of the motor vehicle, said controller being configured to control said antenna structure to selectively change a setting of said main lobe, said controller adjusting a beam spread angle of said main lobe of said antenna structure in dependence on a travel speed of the first motor vehicle.

2. A motor vehicle equipped for radio communication with at least one other motor vehicle, comprising:
- an antenna structure for transmitting and receiving useful radio signals in a radio communication with the at least one other motor vehicle, said antenna structure having a main lobe; and
- a controller connected to said antenna structure and having an input for receiving from a speed recording device of the motor vehicle a signal representing a travel speed of the motor vehicle, said controller being configured to control said antenna structure to selectively change a setting of said main lobe by adjusting a beam spread angle of said main lobe of said antenna structure in dependence on a travel speed of the motor vehicle, the travel speed being provided by the speed recording device.

3. The motor vehicle according to claim 2, wherein said antenna structure includes a plurality of individual emitters and said controller is configured such that an alignment of said main lobe in a horizontal plane of a radiation pattern can be set by way of activating phase positions of signals of said individual emitters.

4. The motor vehicle according to claim 2, wherein said controller is configured to decrease a beam spread angle of said main lobe of said antenna structure with an increase in a travel speed of the motor vehicle.

5. The motor vehicle according to claim 2, wherein the controller is adjusted in such a way that at high vehicle speed, the beam spread angle of the main lobe is kept low more often and for a longer period of time than at low vehicle speed.

6. The motor vehicle according to claim 2, wherein said controller is configured to retain an alignment of said main lobe towards a stationary target.

7. The motor vehicle according to claim 2, wherein said controller is configured to cause an alignment of said main lobe of said antenna structure to be adjusted to a steering direction of the motor vehicle, the steering direction being provided by a direction recording device.

8. A motor vehicle equipped for radio communication with at least one other motor vehicle, comprising:
- an antenna structure for transmitting and receiving useful radio communication signals, said antenna structure having a main lobe; and
- a controller connected to said antenna structure and configured to continuously change a direction angle of said main lobe of said antenna structure for establishing a communication connection to the other motor vehicle, said controller receiving a signal from a speed recording device indicating a speed of the motor vehicle and reducing a maximum angle of deflection for the direction of said main lobe of said antenna structure with increasing vehicle speed.

9. The motor vehicle according to claim 8, wherein said controller is configured to continuously move said main lobe of said antenna structure to and fro.

10. A method for operating an antenna structure installed in a motor vehicle, which comprises:
- transmitting and receiving radio communication signals with the antenna structure;
- feeding a signal from a speed recording device representing a current travel speed of the motor vehicle to a controller;
- controlling the antenna structure with the controller and thereby changing a setting of a main lobe of the antenna structure; and
- adjusting a beam spread angle of the main lobe of the antenna structure as a function of a travel speed of the motor vehicle.

11. The method according to claim 10, wherein the controlling step comprises setting an alignment of the main lobe of the antenna structure in a horizontal plane of a radiation pattern by way of activating phase positions of signals of individual emitters of the antenna.

12. The method according to claim 10, which comprises narrowing a beam spread angle of the main lobe of the antenna structure with an increasing vehicle speed.

13. A method for operating an antenna structure installed in a motor vehicle, which comprises:
- transmitting and receiving useful signals with the antenna structure;
- receiving with a controller a signal from a speed recording device representing a travel speed of the motor vehicle;
- controlling the antenna structure with the controller and thereby changing a setting of a main lobe of the antenna structure by continuously changing an angle of a direction of the main lobe of the antenna structure for establishment of a communication connection with another motor vehicle; and
- decreasing a maximum angle of deflection for the direction of the main lobe of the antenna structure with increasing vehicle speed.

14. The method according to claim 13, which comprises continuously moving to and fro the angle of the direction of the main lobe of the antenna structure.

* * * * *